US012597632B2

(12) United States Patent
Baek et al.

(10) Patent No.: US 12,597,632 B2
(45) Date of Patent: Apr. 7, 2026

(54) ELECTRODE ASSEMBLY HAVING EXTERNAL SHAPE FIXATION FRAME AND LITHIUM SECONDARY BATTERY INCLUDING THE SAME

(71) Applicant: LG Energy Solution, Ltd., Seoul (KR)

(72) Inventors: Ga Young Baek, Daejeon (KR); Jung Shik Oh, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 703 days.

(21) Appl. No.: 17/917,140

(22) PCT Filed: Dec. 22, 2021

(86) PCT No.: PCT/KR2021/019654
§ 371 (c)(1),
(2) Date: Oct. 5, 2022

(87) PCT Pub. No.: WO2022/164038
PCT Pub. Date: Aug. 4, 2022

(65) Prior Publication Data
US 2023/0155164 A1 May 18, 2023

(30) Foreign Application Priority Data
Jan. 28, 2021 (KR) ........................ 10-2021-0012526

(51) Int. Cl.
*H01M 50/593* (2021.01)
*H01M 10/04* (2006.01)
(Continued)

(52) U.S. Cl.
CPC ... *H01M 10/0486* (2013.01); *H01M 10/0431* (2013.01); *H01M 10/0525* (2013.01); *H01M 50/414* (2021.01)

(58) Field of Classification Search
CPC ......... H01M 10/0486; H01M 10/0431; H01M 10/0525; H01M 50/414
See application file for complete search history.

(56) References Cited

U.S. PATENT DOCUMENTS

| | | | |
|---|---|---|---|
| 5,670,278 A | 9/1997 | Disselbeck et al. | |
| 6,743,546 B1 | 6/2004 | Kaneda et al. | |

(Continued)

FOREIGN PATENT DOCUMENTS

| | | |
|---|---|---|
| CN | 1316114 A | 10/2001 |
| CN | 205564846 U | 9/2016 |

(Continued)

OTHER PUBLICATIONS

KR20140050182A. Apr. 29, 2014. English machine translation by EPO. (Year: 2014).*

(Continued)

*Primary Examiner* — James Lee
(74) *Attorney, Agent, or Firm* — Lerner David LLP

(57) ABSTRACT

The present invention relates to an electrode assembly having an external shape fixation frame, and more particularly an electrode assembly including a unit cell including one or more electrodes and one or more separators, wherein the electrode assembly is (1) a stacked type electrode assembly, (2) a stacked and folded type electrode assembly, or (3) a wound type electrode assembly, and the electrode assembly includes an external shape fixation frame configured to wrap a portion of an outer surface of the electrode assembly, and a lithium secondary battery including the same.

13 Claims, 5 Drawing Sheets

100

(51) Int. Cl.
   H01M 10/0525        (2010.01)
   H01M 50/414        (2021.01)

(56)                References Cited

U.S. PATENT DOCUMENTS

| | | | |
|---|---|---|---|
| 6,844,109 | B2 | 1/2005 | Xing et al. |
| 2009/0263712 | A1 | 10/2009 | Mizuta et al. |
| 2010/0227216 | A1 | 9/2010 | Tominaga et al. |
| 2011/0117426 | A1 | 5/2011 | Choi et al. |
| 2012/0107673 | A1 | 5/2012 | Sakashita et al. |
| 2012/0237809 | A1 | 9/2012 | Ahn et al. |
| 2013/0052510 | A1 | 2/2013 | Miyazaki et al. |
| 2013/0078507 | A1 | 3/2013 | Mizuta et al. |
| 2014/0272507 | A1 | 9/2014 | Ku et al. |
| 2016/0133885 | A1 | 5/2016 | Sakashita et al. |
| 2016/0141587 | A1 | 5/2016 | Suh et al. |
| 2018/0287184 | A1 | 10/2018 | Lee et al. |

FOREIGN PATENT DOCUMENTS

| | | | |
|---|---|---|---|
| JP | H08241706 | A | 9/1996 |
| JP | 2002008599 | A | 1/2002 |
| JP | 2006179442 | A | 7/2006 |
| JP | 2007157427 | A | 6/2007 |
| JP | 2009117255 | A | 5/2009 |
| JP | 2012114066 | A | 6/2012 |
| JP | 2013048054 | A | 3/2013 |
| JP | 2016039094 | A | 3/2016 |
| JP | 2020140874 | A | 9/2020 |
| KR | 20110083894 | A | 7/2011 |
| KR | 101094024 | B1 | 12/2011 |
| KR | 101136799 | B1 | 4/2012 |
| KR | 20140031581 | A | 3/2014 |
| KR | 20140050182 | A | 4/2014 |
| KR | 101758132 | B1 | 7/2017 |
| KR | 101820442 | B1 | 1/2018 |
| KR | 20180084282 | A | 7/2018 |
| KR | 101962187 | B1 | 3/2019 |
| KR | 102058098 | B1 | 12/2019 |
| KR | 20200145333 | A | 12/2020 |
| KR | 102275332 | B1 | 7/2021 |
| WO | 2000059063 | A1 | 10/2000 |
| WO | 2007105541 | A1 | 9/2007 |

OTHER PUBLICATIONS

International Search Report for PCT/KR2021/019654 mailed Mar. 31, 2022. 3 pgs.

Search Report dated Jan. 29, 2024 from the Office Action for Chinese Application No. 202180028033.5 issued Jan. 30, 2024, 3 pages.

Extended European Search Report including Written Opinion for Application No. 21923444.0 dated Jul. 3, 2024, pp. 1-8.

* cited by examiner

【FIG. 1】
10
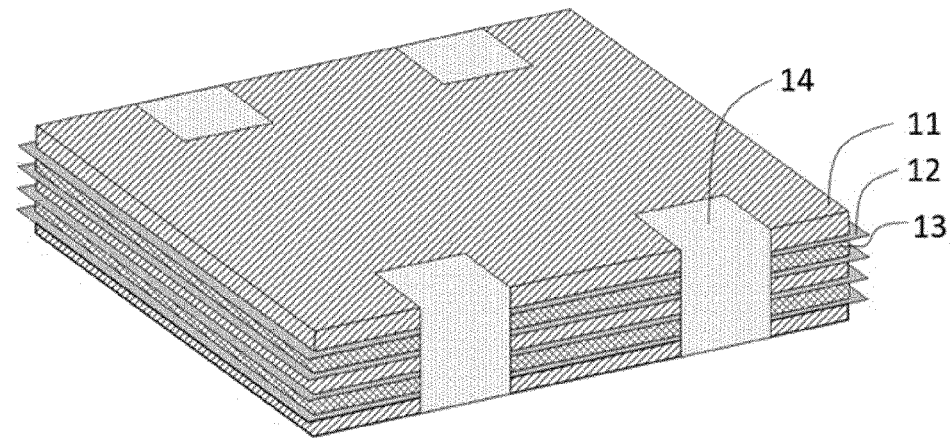
【FIG. 2】
100
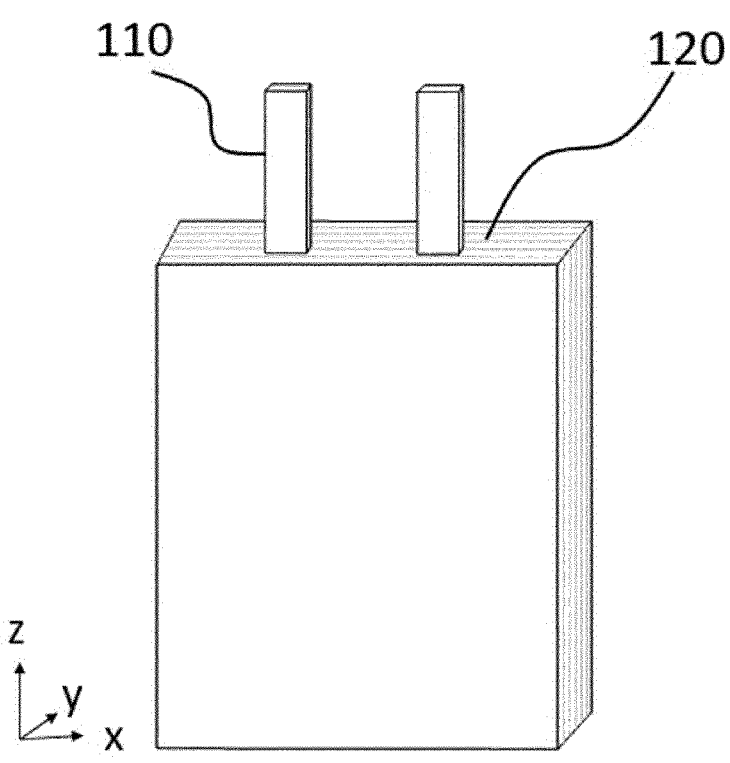

【FIG. 3】
200
210
220
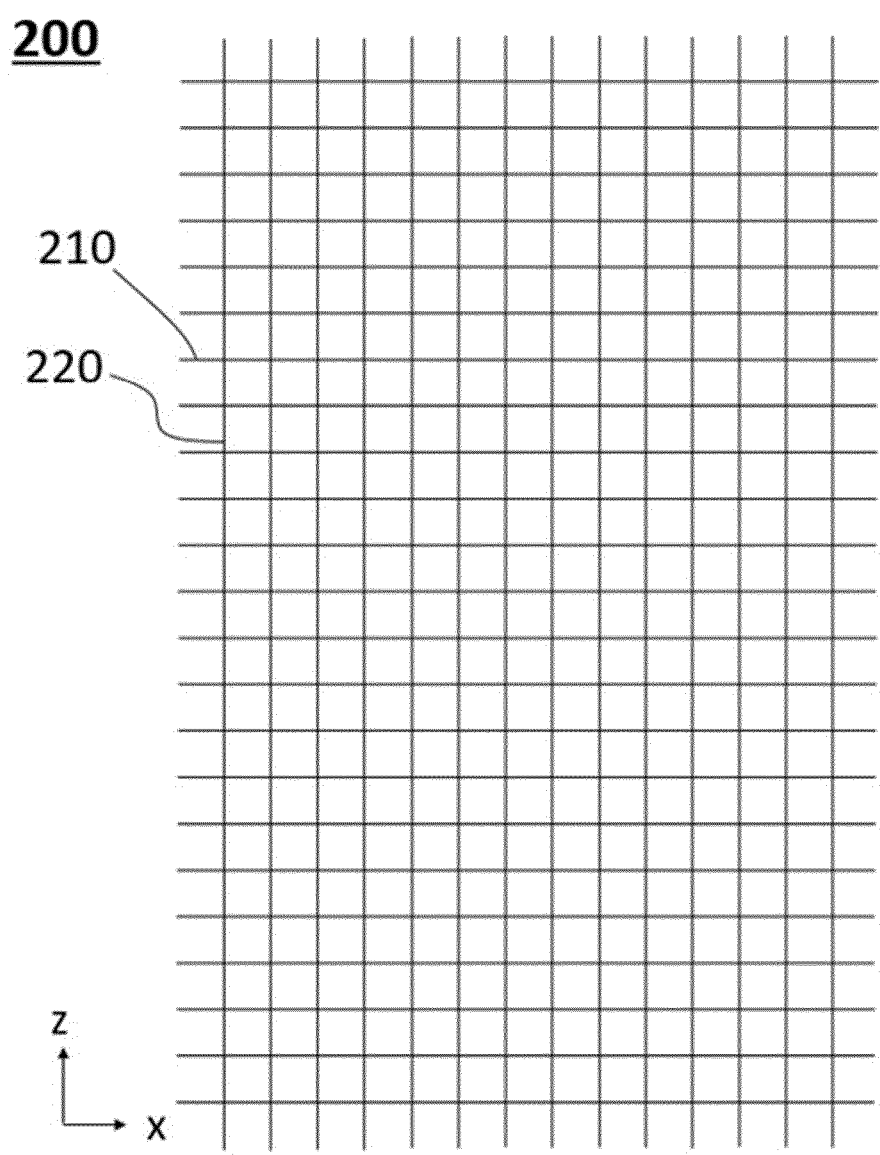

【FIG. 4】
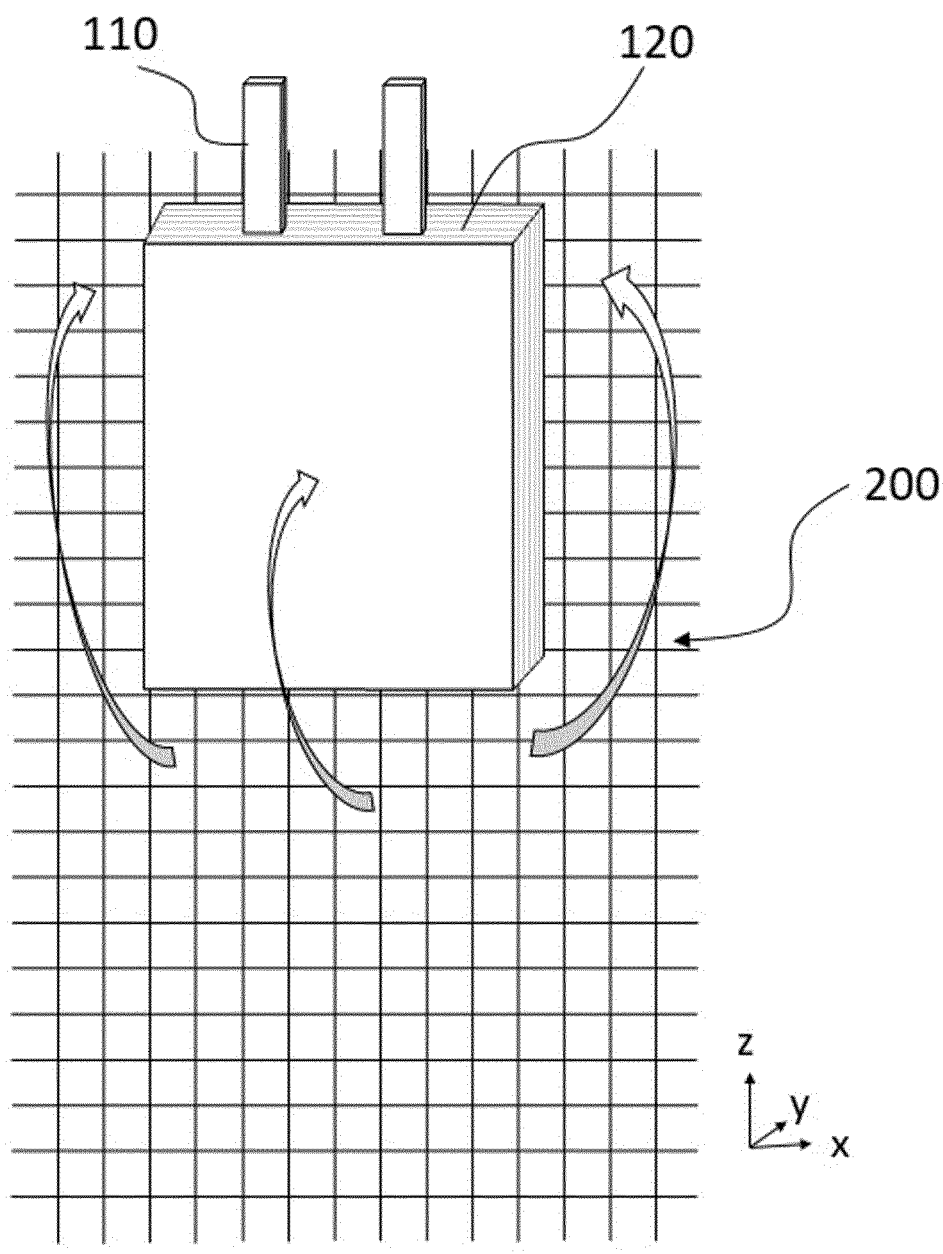

【FIG. 5】
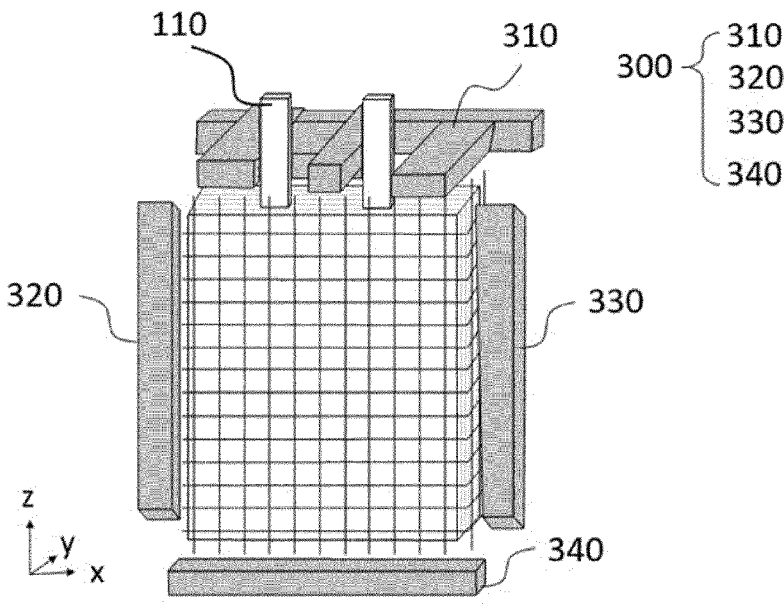
【FIG. 6】
1100
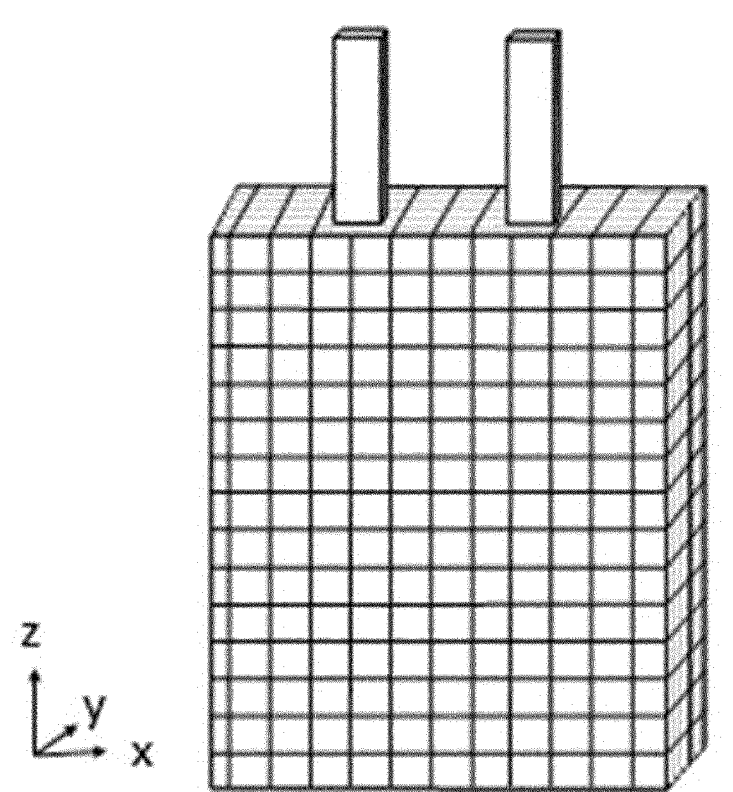

【FIG. 7】
1200
1210
1220
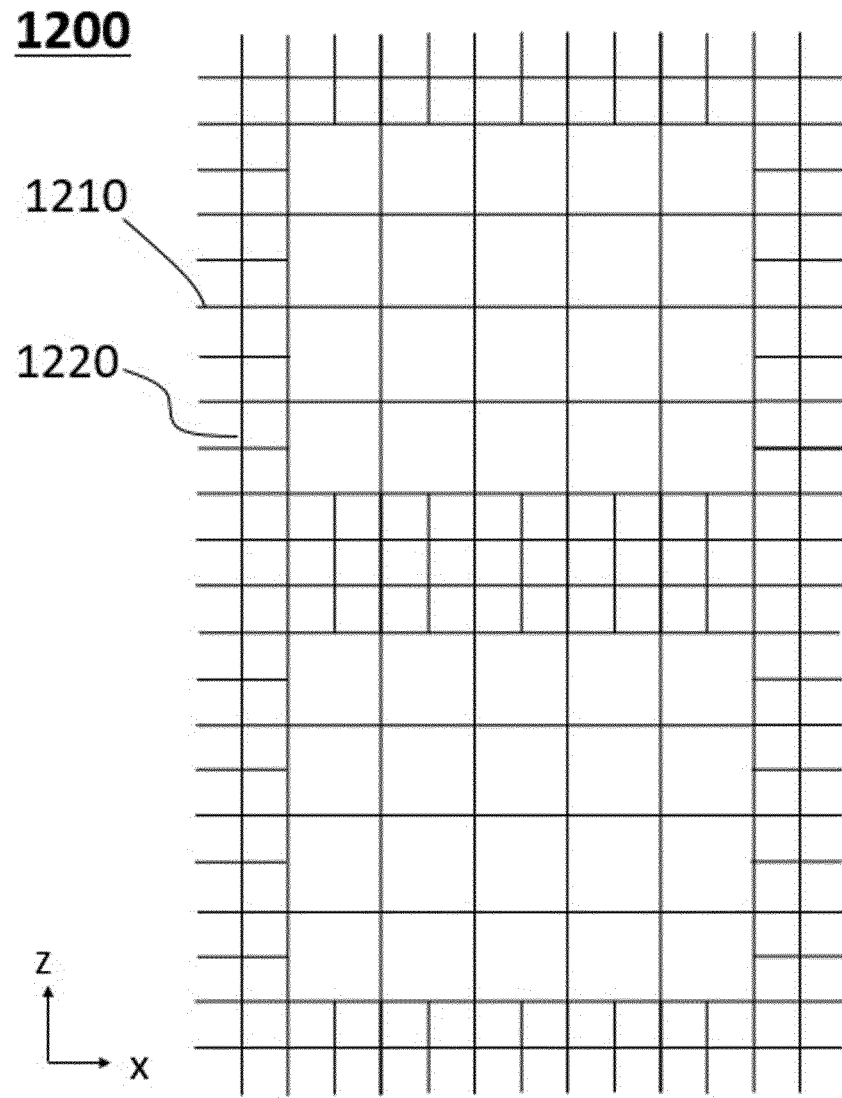
Z
X

ELECTRODE ASSEMBLY HAVING EXTERNAL SHAPE FIXATION FRAME AND LITHIUM SECONDARY BATTERY INCLUDING THE SAME

CROSS-REFERENCE TO RELATED APPLICATIONS

The present application is a national phase entry under 35 U.S.C. § 371 of International Application No. PCT/KR2021/019654, filed on Dec. 22, 2021, which claims priority from Korean Patent Application No. 10-2021-0012526 filed on Jan. 28, 2021, the disclosure of which is incorporated herein by reference in its entirety.

TECHNICAL FIELD

The present invention relates to an electrode assembly having an external shape fixation frame and a lithium secondary battery including the same. More particularly, the present invention relates to an electrode assembly having an external shape fixation frame with improved stability, wherein the external shape fixation frame is provided at an outer surface of the electrode assembly, whereby it is possible to prevent movement or shaking of an electrode and/or deformation, such as rolling, of a separator, and a lithium secondary battery including the same.

BACKGROUND ART

With an increase in demand for mobile devices, such as smartphones, demand for secondary batteries used as energy sources thereof has also increased. In addition, secondary batteries are used in an electric vehicle (EV), a hybrid electric vehicle (HEV), a plug-in hybrid electric vehicle (P-HEV), an energy storage system (ESS), etc.

When describing the structure of a secondary battery, the secondary battery is generally classified as a cylindrical battery, a prismatic battery, or a pouch-shaped battery based on structural features of the outside and the inside thereof. Thereamong, the prismatic battery and the pouch-shaped battery, each of which is capable of being stacked with high integration and has a small width to length ratio, have attracted special attention.

An electrode assembly having a positive electrode/separator/negative electrode structure constituting the secondary battery is mainly classified as a jelly-roll type (wound type) electrode assembly or a stacked type electrode assembly. The jelly-roll type electrode assembly is manufactured by coating metal foil used as a current collector with an electrode active material, drying the same, and pressing the same, cutting the metal foil into a band shape having a desired width and length, stacking a negative electrode and a positive electrode using a separator, and spirally winding the stack. The jelly-roll type electrode assembly is suitable for a cylindrical battery; however, there are problems, such as separation of the electrode active material and low space utilization, in applying the jelly-roll type electrode assembly to a prismatic or pouch-shaped battery.

In order to solve the above problems, a pouch-shaped battery having a structure in which a stacked type electrode assembly or a stacked and folded type electrode assembly is mounted in a pouch-shaped battery case made of a laminate sheet has been developed, has attracted considerable attention for reasons of low manufacturing cost, light weight, and easy deformation, and has been increasingly used.

One of the principal research projects for secondary batteries is to improve the safety of the secondary batteries. In general, a secondary battery may explode due to high temperature and high pressure in the secondary battery which may be caused by an abnormal state of the secondary battery, such as short circuit in the secondary battery, overcharge of the secondary battery with higher than allowed current or voltage, exposure of the secondary battery to high temperature, or deformation by external impact applied to the secondary battery, such as dropping of the secondary battery.

As one of such safety-related problems, the stacked type electrode assembly or the stacked and folded type electrode assembly has a high possibility that, when the battery is dropped or external impact is applied to the battery, the separator may be rolled, and short circuit may occur between the electrodes due to movement of the electrodes relative to the separator, and therefore an adhesive tape for fixation configured to fix the electrode assembly may be added to an outer circumferential surface of the electrode assembly.

FIG. 1 is a schematic view showing the structure of a conventional stacked type electrode assembly configured such that an adhesive tape is added to an outer circumferential surface of the electrode assembly.

Referring to FIG. 1, the electrode assembly 10 is configured to have a structure in which positive electrodes 11, negative electrodes 13, and separators 12 interposed between the positive electrodes 11 and the negative electrodes 13 are alternately stacked, wherein two adhesive tapes 14 are added to outer circumferential surfaces of the electrode assembly 10 that are opposite each other. In order to prevent misalignment of the positive electrodes, the negative electrodes, and the separators during transfer of the electrode assembly 10, the adhesive tapes for fixation are added to a portion of the outer circumferential surfaces of the electrode assembly. However, the conventional electrode assembly has a problem in that a battery cell defect rate is increased due to irregular attachment of the adhesive tapes.

Korean Registered Patent Publication No. 10-1820442 ("the '442 publication") discloses an apparatus for attaching an adhesive tape to an outer surface of an electrode assembly having a structure in which a positive electrode, a negative electrode, and a separator interposed between the positive electrode and the negative electrode are stacked, wherein the apparatus includes a taping unit having a fixing end configured to fix an upper part of a non-adhesive surface of the adhesive tape, a clamp configured to draw out the adhesive tape, and a transfer unit, and a first fixing end and a second fixing end form a step at a position relative to the electrode assembly.

The '442 publication discloses the apparatus and technology for uniformly attaching the adhesive tape to the outer surface of an electrode assembly, but does not disclose an electrode assembly capable of preventing movement of an electrode located in the middle of the electrode assembly and preventing deformation, such as rolling, of a separator located in the middle of the electrode assembly.

An effective means capable of solving problems, such as movement or deformation, such as rolling, of an electrode and/or a separator located in the middle of an electrode assembly including a plurality of unit cells is therefore desirable.

DISCLOSURE

Technical Problem

The present invention has been made in view of the above problems, and it is an object of the present invention to provide an electrode assembly having an external shape fixation frame capable of preventing movement or deformation of an electrode and/or a separator located in the middle of the electrode assembly.

It is another object of the present invention to provide an electrode assembly having an external shape fixation frame with improved stability.

Technical Solution

In order to accomplish the above objects, an electrode assembly according to the present invention includes a unit cell including one or more electrodes and one or more separators, wherein the electrode assembly is at least one selected from among a stacked type electrode assembly, a stacked and folded type electrode assembly, and a wound type electrode assembly, and the electrode assembly includes an external shape fixation frame configured to wrap a portion of an outer surface of the electrode assembly.

In the electrode assembly according to the present invention, the unit cell may be a full cell, and the electrode assembly may include two or more full cells.

In the electrode assembly according to the present invention, the unit cell may be a bi-cell, and the electrode assembly may include one or more bi-cells.

In the electrode assembly according to the present invention, the unit cell may be a mono type half cell, and the electrode assembly may include three or more half cells.

In the electrode assembly according to the present invention, a first electrode terminal of a first electrode and a second electrode terminal of a second electrode may be located in an identical direction.

In the electrode assembly according to the present invention, the electrode assembly may be configured to have a rectangular parallelepiped shape, the rectangular parallelepiped electrode assembly may include a first surface at which the electrode terminals are located, a second surface opposite the first surface, a third surface and a fourth surface, opposite ends of which abut the first surface and the second surface, the third surface and the fourth surface having relatively small areas, and a fifth surface and a sixth surface, opposite ends of which abut the first surface and the second surface, the fifth surface and the sixth surface having relatively large areas, and the external shape fixation frame may be provided at regions corresponding to one or more of the first surface to the sixth surface.

In the electrode assembly according to the present invention, the external shape fixation frame may be located at regions corresponding to the first surface and the second surface of the electrode assembly.

In the electrode assembly according to the present invention, the external shape fixation frame may be located at regions corresponding to the first surface to fourth surface of the electrode assembly.

In the electrode assembly according to the present invention, the size of the external shape fixation frame may be 80% to 100% of the size of the outer surface of the electrode assembly at the region at which the external shape fixation frame is located.

In the electrode assembly according to the present invention, the external shape fixation frame may be configured to have a lattice shape.

In the electrode assembly according to the present invention, the external shape fixation frame may be made of a thermoplastic resin.

The present invention provides a lithium secondary battery including the electrode assembly according to the present invention, a battery case configured to receive the electrode assembly, and an electrolytic solution.

The present invention provides a battery module including the lithium secondary battery.

In the present invention, one or more constructions that do not conflict with each other may be selected and combined from among the above constructions.

Advantageous Effects

An external shape fixation frame according to the present invention is disposed at an outer surface of an electrode assembly, whereby it is possible to prevent rolling or deformation of a separator and movement and deformation of an electrode due to dropping or vibration, and therefore it is possible to improve stability of the electrode assembly.

Since the external shape fixation frame according to the present invention is disposed at the outer surface of the electrode assembly, it is possible to prevent rolling or deformation of the separator of the electrode assembly, and therefore it is possible to prevent short circuit between electrodes and to improve safety.

Since a conventional electrode assembly can be used without change, it is unnecessary to change an electrode assembly production process, which is economically advantageous.

DESCRIPTION OF DRAWINGS

FIG. 1 is a schematic view of a conventional electrode assembly.

FIG. 2 is a schematic view of a battery cell according to a first embodiment of the present invention.

FIG. 3 is a schematic view of an external shape fixation frame according to a first embodiment of the present invention.

FIG. 4 is a schematic view showing that the external shape fixation frame according to the first embodiment of the present invention wraps a battery cell.

FIG. 5 is a schematic view showing that the external shape fixation frame is fixed using a sealing apparatus according to a first embodiment of the present invention.

FIG. 6 is a schematic view of a battery cell fixed to the external shape fixation frame according to the first embodiment of the present invention.

FIG. 7 is a schematic view of an external shape fixation frame according to a second embodiment of the present invention.

BEST MODE

In the present application, it should be understood that the terms "comprises," "has," "includes," etc. specify the presence of stated features, numbers, steps, operations, elements, components, or combinations thereof, but do not preclude the presence or addition of one or more other features, numbers, steps, operations, elements, components, or combinations thereof.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, a battery module according to the present invention will be described with reference to the accompanying drawings.

FIG. 2 is a schematic view of an electrode assembly according to a first embodiment of the present invention, FIG. 3 is a schematic view of an external shape fixation frame according to a first embodiment of the present invention, FIG. 4 is a schematic view showing that the external shape fixation frame according to the first embodiment of the present invention wraps an electrode assembly, FIG. 5 is a schematic view showing that the external shape fixation frame is fixed using a sealing apparatus according to a first embodiment of the present invention, and FIG. 6 is a schematic view of a battery cell fixed to the external shape fixation frame according to the first embodiment of the present invention.

The electrode assembly according to the first embodiment of the present invention will be described with reference to FIGS. 2 to 6.

In the present invention, the electrode assembly 120 may be a stacked type electrode assembly, which is configured to have a structure in which unit cells, in each of which a separator is interposed between a first electrode and a second electrode, are stacked, or a stacked and folded type electrode assembly, which is configured to have a structure in which the battery cells are wound using a separator sheet. Here, the electrode assembly 120 may include three or more electrodes and two or more separators. The electrodes may include a first electrode and a second electrode. The first electrode may be a negative electrode or a positive electrode, and the second electrode may be a positive electrode or a negative electrode. Positive electrode tabs protruding from a positive electrode current collector are provided at one end of the positive electrode, and negative electrode tabs protruding from a negative electrode current collector are provided at one end of the negative electrode. The positive electrode tab and the negative electrode tabs are formed at one end of the electrode assembly in the same direction in a state of being spaced apart from each other.

In the present invention, electrode terminals 110 may be the electrode tabs, or may be electrode leads obtained by welding the electrode tabs in a state of being distinguished between the positive electrode and the negative electrode. In the case in which the electrode terminals are the electrode tabs, the plurality of electrode tabs may be directly welded to electrical connection members. In the case in which the electrode terminals are the electrode leads, the plurality of electrode tabs may be welded to the electrode leads, and the electrode leads may be welded to the electrical connection members.

Each of the connection members may have various shapes. The shape of the connection member is not particularly restricted as long as electrical connection to electrode terminals of a unit cell and/or electrical connection with external input and output terminals is easily achieved. In the present invention, the kind of welding is not particularly restricted. For example, ultrasonic welding, laser welding, spot welding, or seam welding may be used.

In the present invention, the shape of the electrode assembly is not particularly restricted, and any of various shapes may be employed. For example, a stacked and folded type electrode assembly in which one or more types of stacked type unit cells are wound using a long separation film in a cross state, a stacked and folded type electrode assembly including the same type of stacked type unit cells as the above type of stacked and folded type electrode assembly, a Z-shaped stacked and folded type electrode assembly in which the stacked type unit cells are wound using a separation film while being folded in a zigzag fashion, a stacked and folded type electrode assembly in which the stacked unit cells are continuously wound in the same direction, an electrode assembly in which the stacked type cells are not folded using a separation film as unit cells but are continuously wound in the state in which positive electrodes and negative electrodes are alternately placed on a separation film, a Z-shaped electrode assembly in which the stacked type cells are wound in a zigzag fashion, and a jelly-roll type electrode assembly in which a general stacked type electrode assembly, a positive electrode plate, a separator, and a negative electrode plate are wound in one direction while being disposed in that order may be included.

A full cell having a positive electrode/separator/negative electrode structure or a positive electrode/separator/negative electrode/separator/positive electrode/separator/negative electrode structure may be used as the unit cell according to the present invention. In order to form an electrode assembly using full cells, a plurality of full cells may be stacked such that the positive electrode and the negative electrode face each other in the state in which the separator sheet is interposed therebetween.

A bi-cell may be used as the unit cell according to the present invention. The bi-cell is a cell having identical electrodes provided at opposite sides thereof, e.g. a cell having a positive electrode/separator/negative electrode/separator/positive electrode structure or a negative electrode/separator/positive electrode/separator/negative electrode structure as a unit structure. At least one of an A-type bi-cell having a positive electrode/separator/negative electrode/separator/positive electrode structure and a C-type bi-cell having a negative electrode/separator/positive electrode/separator/negative electrode structure may be included. As long as the bi-cell has a structure in which electrodes provided at opposite sides thereof are identical, the number of positive electrodes, negative electrodes, and separators constituting the bi-cell is not particularly restricted.

A half cell may be used as the unit cell according to the present invention. The half cell includes a mono type half cell having a negative electrode/separator/positive electrode structure.

In the present invention, the positive electrode may be manufactured by applying a mixture of a positive electrode active material, a conductive agent, and a binder to a positive electrode current collector and drying the mixture. A filler may be further added to the mixture, as needed.

The positive electrode active material may be constituted, for example, by a layered compound, such as a lithium cobalt oxide ($LiCoO_2$) or a lithium nickel oxide ($LiNiO_2$), or a compound substituted with one or more transition metals; a lithium manganese oxide represented by the chemical formula $Li_{1+x}Mn_{2-x}O_4$ (where x=0 to 0.33) or a lithium manganese oxide, such as $LiMnO_3$, $LiMn_2O_3$, or $LiMnO_2$; a lithium copper oxide ($Li_2CuO_2$); a vanadium oxide, such as $LiV_3O_8$, $LiFe_3O_4$, $V_2O_5$, or $Cu_2V_2O_7$; an Ni-sited lithium nickel oxide represented by the chemical formula $LiNi_{1-x}M_xO_2$ (where M=Co, Mn, Al, Cu, Fe, Mg, B, or Ga, and x=0.01 to 0.3); a lithium manganese composite oxide represented by the chemical formula $LiMn_{2-x}M_xO_2$ (where M=Co, Ni, Fe, Cr, Zn, or Ta, and x=0.01 to 0.1) or the chemical formula $Li_2Mn_3MO_8$ (where M=Fe, Co, Ni, Cu, or Zn); $LiMn_2O_4$ in which a portion of Li in the chemical formula is replaced by alkaline earth metal ions; a disulfide compound; or $Fe_2(MoO_4)_3$. However, the present invention is not limited thereto.

In general, the positive electrode current collector is manufactured so as to have a thickness of 3 μm to 500 μm.

The positive electrode current collector is not particularly restricted as long as the positive electrode current collector exhibits high conductivity while the positive electrode current collector does not induce any chemical change in a battery to which the positive electrode current collector is applied. For example, the positive electrode current collector may be made of stainless steel, aluminum, nickel, titanium, or sintered carbon. Alternatively, the positive electrode current collector may be made of aluminum or stainless steel, the surface of which is treated with carbon, nickel, titanium, or silver. Specifically, aluminum may be used. The current collector may have a micro-scale uneven pattern formed on the surface thereof so as to increase the force of adhesion to the positive electrode active material. The positive electrode current collector may be configured in any of various forms, such as a film, a sheet, a foil, a net, a porous body, a foam body, and a non-woven fabric body.

The conductive agent is generally added so that the conductive agent accounts for 1 to 50 weight % based on the total weight of the mixture including the positive electrode active material. The conductive agent is not particularly restricted as long as the conductive agent exhibits high conductivity without inducing any chemical change in a battery to which the conductive agent is applied. For example, graphite, such as natural graphite or artificial graphite; carbon black, such as carbon black, acetylene black, Ketjen black, channel black, furnace black, lamp black, or thermal black; conductive fiber, such as carbon fiber or metallic fiber; carbon fluoride powder; metallic powder, such as aluminum powder, or nickel powder; conductive whisker, such as zinc oxide or potassium titanate; a conductive metal oxide, such as titanium oxide; or a conductive material, such as a polyphenylene derivative, may be used as the conductive agent.

The binder is a component assisting in binding between the active material and the conductive agent and in binding with the current collector. The binder is generally added in an amount of 1 to 50 weight % based on the total weight of the mixture including the positive electrode active material. As examples of the binder, there may be used polyvinylidene fluoride, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluoro rubber, and various copolymers.

The filler is an optional component used to inhibit expansion of the positive electrode. There is no particular limit to the filler, as long as the filler is made of a fibrous material while the filler does not cause chemical changes in a battery to which the filler is applied. For example, an olefin-based polymer, such as polyethylene or polypropylene; or a fibrous material, such as glass fiber or carbon fiber is used as the filler.

The negative electrode is manufactured by applying a negative electrode active material to a negative electrode current collector, drying the same, and pressing the same. The above-described components, i.e. the conductive agent, the binder, and the filler, may be selectively further included as needed.

As the negative electrode active material, for example, there may be used carbon, such as a non-graphitizing carbon or a graphite-based carbon; a metal composite oxide, such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, Group 1, 2, and 3 elements of the periodic table, halogen; $0 < x \leq 1$; $1 \leq y \leq 3$; $1 \leq z \leq 8$); lithium metal; a lithium alloy; a silicon-based alloy; a tin-based alloy; a metal oxide, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, or $Bi_2O_5$; a conductive polymer, such as polyacetylene; or a Li—Co—Ni based material.

The negative electrode current collector is generally manufactured so as to have a thickness of 3 μm to 500 μm.

The negative electrode current collector is not particularly restricted, as long as the negative electrode current collector exhibits high conductivity while the negative electrode current collector does not induce any chemical change in a battery to which the negative electrode current collector is applied. For example, the negative electrode current collector may be made of copper, stainless steel, aluminum, nickel, titanium, or sintered carbon. Alternatively, the negative electrode current collector may be made of copper or stainless steel, the surface of which is treated with carbon, nickel, titanium, or silver, or an aluminum-cadmium alloy. In addition, the negative electrode current collector may have a micro-scale uneven pattern formed on the surface thereof so as to increase binding force of the negative electrode active material, in the same manner as the positive electrode current collector. The negative electrode current collector may be configured in any of various forms, such as a film, a sheet, a foil, a net, a porous body, a foam body, and a non-woven fabric body.

In the present invention, a thin insulative film having high ionic permeability and mechanical strength may be used as the separator. The pore diameter of the separator may range 0.01 to 10 μm, and the thickness of the separator may range 5 to 300 μm. However, the present invention is not limited thereto. As the material for the separator, for example, a sheet or non-woven fabric made of an olefin-based polymer, such as polypropylene, which exhibits chemical resistance and hydrophobicity, glass fiber, or polyethylene may be used. Preferably, the material for the separator is selected from the group consisting of a polyethylene film including micropores; a polypropylene film, a multilayered film manufactured through a combination of the above films; and a polymer film for polyelectrolyte, such as polyvinylidene fluoride, polyethylene oxide, polyacrylonitrile, or polyvinylidene fluoride-co-hexafluoropropylene.

In a preferred example, opposite surfaces of the separator may be coated with inorganic powder by a binder. For example, the inorganic powder may be selected from the group consisting of inorganic particles having a permittivity constant of 5 or more, inorganic particles having lithium ion transfer ability, and a mixture thereof, and may have a particle size of 0.001 to 10 μm. In general, the permittivity constant is a factor that contributes to an increase in degree of dissociation of lithium salt, such as electrolyte salt, in an electrolyte to improve ionic conductivity of an electrolytic solution. The inorganic particles having a permittivity constant of 5 or more may be, for example, $BaTiO_3$, $Pb(Zr, Ti)O_3$, $Pb_{1-x}La_xZr_{1-y}Ti_yO_3$ ($0 \leq x$, $y \leq 1$), $PB(Mg_3Nb_{2/3})O_3$—$PbTiO_3$, hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC, $TiO_2$, or a mixture of two or more thereof.

The inorganic particles having lithium ion transfer ability may be, for example, $Li_3PO_4$, $Li_xTi_y(PO_4)_3$ ($0 < x < 2$, $0 < y < 3$), $Li_xAl_yTi_z(PO_4)_3$ ($0 < x < 2$, $0 < y < 1$, $0 < z < 3$), (LiAlTiP)$_xO_y$-based glass ($0 < x < 4$, $0 < y < 13$), $Li_xLa_yTiO_3$ ($0 < x < 2$, $0 < y < 3$), $Li_xGe_yP_zS_w$ ($0 < x < 4$, $0 < y < 1$, $0 < z < 1$, $0 < w < 5$), $Li_xN_y$ ($0 < x < 4$, 0<y<2), SiS$_2$ (Li$_x$Si$_y$S$_z$: 0<x<3, 0<y<2, 0<z<4) based glass, P$_2$S$_5$(Li$_x$P$_y$S$_z$: 0<x<3, 0<y<3, 0<z<7) based glass, or a mixture of two or more thereof.

For example, polyvinylidene fluoride, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluoro rubber, or various copolymers may be used as the binder.

In the present invention, the separator sheet may have the same nature as the separator of the full cell or the bi-cell and may be made of the same material as the separator of the full cell or the bi-cell, or may have different nature from the nature of the separator of the full cell or the bi-cell and may be made of a material different from the material for the separator of the full cell or the bi-cell.

Although not shown in the drawings of the present invention, the battery cell 100 constituted by the electrode terminals 110 and the electrode assembly 120 according to the present invention is received in a pouch-shaped case. The pouch-shaped case may be made of a laminate sheet including a resin layer and a metal layer, and the edge of the pouch-shaped case may be thermally fused so as to be hermetically sealed in the state in which the electrode assembly 120 and the electrolytic solution are received in the pouch-shaped case. More specifically, the pouch-shaped case may be constituted by two cases, i.e. an upper case and a lower case, and a concave inner space may be formed in at least one thereof. The edges of the upper case and the lower case may be thermally fused, whereby the inner space, in which the electrode assembly is received, may be hermetically sealed.

In addition, the laminate sheet generally includes a gas barrier layer, a surface protection layer, and a sealant layer. The gas barrier layer secures mechanical strength of the battery case, blocks introduction of external gas or moisture into the secondary battery, and prevents leakage of the electrolytic solution.

In general, the gas barrier layer includes metal, and aluminum (Al) foil is mainly used. The reason for this is that aluminum foil is lightweight while being capable of securing a predetermined level of mechanical strength and it is possible to complement electrochemical properties of the electrode assembly 120 and the electrolytic solution and to secure heat dissipation.

The surface protection layer is made of a polymer, and is located at the outermost layer to electrically isolate the electrode assembly 120 from the outside while protecting the secondary battery from friction and collision with the outside. Here, the outermost layer is a direction opposite a direction in which the electrode assembly 120 is located based on the gas barrier layer, i.e. a direction toward the outside.

The surface protection layer is mainly made of a polymer that has wear resistance and heat resistance, such as nylon or polyethylene terephthalate (PET). In addition, the surface protection layer may have a single film structure made of any one material or a composite film structure including two or more material layers.

The sealant layer is made of a polymer, and is located at the innermost layer so as to directly contact the electrode assembly 120. When the laminate sheet having the above stacked structure is drawn using a punch, a portion of the laminate sheet is stretched, whereby a pouch-shaped battery case having an upper receiving portion and a lower receiving portion is manufactured.

After the electrode assembly 120 is received in the receiving portion, an electrolytic solution is injected into the receiving portion. Subsequently, the upper case and the lower case are brought into contact with each other, and a sealed portion are thermally fused, whereby the sealant layers are joined to each other, and therefore the battery case is hermetically sealed.

The sealant layer is disposed in direct contact with the electrode assembly 120, and therefore the sealant layer must exhibit high insulation properties. In addition, the sealant layer also contacts the electrolytic solution, and therefore the sealant layer must exhibit high corrosion resistance. Furthermore, the sealant layer must completely seal the interior of the battery case to block movement of materials between the inside and the outside of the battery case, and therefore the sealant layer must exhibit high sealability. That is, the sealed portion between the sealant layers must exhibit excellent thermal bonding strength.

In general, the sealant layer is mainly made of a polyolefin-based resin, such as polypropylene (PP) or polyethylene (PE). Since polypropylene (PP) exhibits excellent mechanical-physical properties, such as tensile strength, rigidity, surface hardness, wear resistance, and heat resistance, and excellent chemical properties, such as corrosion resistance, polypropylene is mainly used to manufacture the sealant layer. Furthermore, the sealant layer may be made of cast polypropylene or a terpolymer of polypropylene, butylene, and ethylene. In addition, the sealant layer may have a single film structure made of any one material or a composite film structure including two or more material layers.

The electrode assembly 120 according to the present invention has a rectangular parallelepiped shape, and the rectangular parallelepiped electrode assembly includes a first surface, at which the electrode terminals 110 are located, a second surface, which is a surface opposite the first surface, a third surface and a fourth surface, opposite ends of which abut the first surface and the second surface, the third surface and the fourth surface having relatively small areas, and a fifth surface and a sixth surface, opposite ends of which abut the first surface and the second surface, the fifth surface and the sixth surface having relatively large areas. Here, the fifth surface and the sixth surface are relatively large surfaces at which full cells or bi-cells, as unit cells, are formed while facing each other, and surfaces formed as the result of stacking of side surfaces at four edges of the large area surfaces of the unit cells constitute the first surface, the second surface, the third surface, and the fourth surface. In a conventional electrode assembly, the electrode and/or the separator is moved or deformed in a direction toward the first surface, the second surface, the third surface, and the fourth surface, whereby the electrode assembly is defective.

In the present invention, therefore, an external shape fixation frame 200, a description of which will follow, may be located at a region corresponding to at least one of the first to sixth surfaces of the electrode assembly 120. In a concrete example, the external shape fixation frame 200 may be located so as to face surfaces corresponding to the first surface and the second surface of the electrode assembly 120. In another concrete example, the external shape fixation frame 200 may be located so as to face regions corresponding to the third surface and the fourth surface of the electrode assembly 120. Depending on circumstances, the external shape fixation frame 200 may be located at regions corresponding to the first to sixth surfaces of the electrode assembly 120. In this way, the electrode assembly 120 is fixed by the external shape fixation frame 200, which is advantageous in preventing shaking and movement of the electrode and preventing movement, rolling, and deformation of the separator.

In addition, the size of the external shape fixation frame 200 may be 80% to 100% of the size of the outer surface of the electrode assembly 120 at the region at which the external shape fixation frame is located. If the size of the external shape fixation frame 200 is less than 80% of the size of the corresponding outer surface of the electrode assembly 120, an effect of stably fixing the electrode assembly 120 may be reduced. If the size of the external shape fixation frame 200 is greater than 100% of the size of the corresponding outer surface of the electrode assembly 120, the standards or dimensions of the electrode assembly 120 may be affected. Therefore, it is preferable for the size of the external shape fixation frame 200 to be within the range.

Next, when describing the external shape fixation frame 200, the external shape fixation frame 200 according to the present invention may be a lattice-patterned sheet. Specifically, the external shape fixation frame 200 may be configured such that a first pattern 210 and a second pattern 220 intersect. In FIG. 3, the first pattern 210 and the second pattern 220 are shown as intersecting at right angles. However, the intersection angle may be an acute angle or an obtuse angle. In addition, each of the first pattern 210 and the second pattern 220 may have a line shape, and a circular or polygonal section. Specifically, the section of each of the first pattern and the second pattern may have a quadrangular shape, sides of which brought into tight contact with the electrode assembly 120 are flat, which is advantageous in stably wrapping the conventional electrode assembly while minimizing an increase in volume of the electrode assembly.

Also, in FIG. 3, the first pattern 210 and the second pattern 220 are shown as repeated straight lines; however, the patterns may be repeated curved lines. In the present invention, the first pattern 210 and the second pattern 220 may have the same shape and sectional diameter, and the diameter or the width (x-axis direction or z-axis direction in FIG. 4) of the patterns located so as to correspond to the long sides of the electrode assembly 120 may be relatively large depending on the characteristics of the electrode assembly 120.

In the present invention, each of the first pattern 210 and the second pattern 220 may have a size of 0.025 mm to 0.05 mm. However, the size of the patterns is not particularly restricted as long as the external shape fixation frame 200 is shapeable and is capable of stably wrapping the electrode assembly 120.

In addition, the distance between adjacent first patterns 210 and the distance between adjacent second patterns 220 may be uniformly formed, and the distance between adjacent patterns may be 1 mm to 5 mm. If the distance between adjacent patterns is greater than 5 mm, impregnability of the electrolytic solution may be affected. If the distance between adjacent patterns is less than 1 mm, an effect of stably fixing the electrode assembly 120 may be reduced.

In the present invention, the external shape fixation frame 200 may be made of a thermoplastic resin that is electrochemically stable, is lightweight, and has excellent thermal bonding strength. A polyolefin-based resin, such as polypropylene (PP) or polyethylene (PE), may be used as the thermoplastic resin. In the present invention, specifically, the external shape fixation frame 200 may be made of polypropylene (PP). Since polypropylene (PP) exhibits excellent mechanical-physical properties, such as tensile strength, rigidity, surface hardness, wear resistance, and heat resistance, and excellent chemical properties, such as corrosion resistance, polypropylene may stably wrap the electrode assembly 120 and may be adhered to the sealant layer of the battery case through a thermal compression process, which may be advantageous in improving stability. In addition, the external shape fixation frame 200 may be made of cast polypropylene or a terpolymer of polypropylene, butylene, and ethylene.

In the present invention, the external shape fixation frame 200 is fixed to an outer surface of the electrode assembly 120 by a sealing apparatus 300. The sealing apparatus 300 according to the present invention may include an upper sealing tool 310, a first side sealing tool 320, a second side sealing tool 330, and a lower sealing tool 340. In the present invention, the upper sealing tool 310 corresponds to the first surface of the electrode assembly 120, the lower sealing tool 340 corresponds to the second surface of the electrode assembly 120, and the first side sealing tool 320 and the second side sealing tool 330 correspond to the third and fourth surfaces of the electrode assembly 120, respectively. Although not shown in the figure, sealing tools corresponding to the fifth and sixth surfaces of the electrode assembly 120 may be provided depending on circumstances.

Here, the upper sealing tool 310 is configured to have holes corresponding to the horizontal sectional (x-y plane) shapes of the electrode terminals 110 so as to be brought into tight contact with the first surface of the electrode assembly 120 excluding the portions at which the electrode terminals 110 are located, the lower sealing tool 340 is configured to be brought into tight contact with the second surface of the electrode assembly 120, and the first side sealing tool 320 and the second side sealing tool 330 are configured to be brought into tight contact with the third surface and the fourth surface of the electrode assembly 120, respectively.

Also, in the present invention, the areas of the surfaces of the sealing tools 310, 320, 330, and 340 of the sealing apparatus 300 that face the electrode assembly 120 are formed so as to be greater than the sizes of corresponding surfaces of the electrode assembly 120. Specifically, peripheral lengths of the sealing tools 310, 320, 330, and 340 may be equal to or greater than peripheral lengths of the surfaces of the electrode assembly 120 that face the sealing tools, which is advantageous in stably fixing the external shape fixation frame 200 located at respective surfaces of the electrode assembly 120 by thermal fusion.

In the present invention, the sealing tools 310, 320, 330, and 340 may simultaneously or sequentially press the external shape fixation frame 200; however, a pressing method is not particularly restricted as long as the external shape fixation frame 200 can be stably fixed to the outer surface of the electrode assembly 120.

In the present invention, the sealing apparatus 300 is provided with a heating unit, and therefore it is possible to couple the external shape fixation frame 200 by fusion while pressing the external shape fixation frame. Here, the heating unit may perform heating to a temperature between 160° C. and 300° C. If the temperature is lower than 160° C., it is not possible to effectively fix the external shape fixation frame 200 by fusion. If the temperature is higher than 300° C., the electrode assembly 120 may be deformed. The heating unit may be constituted by heating coils mounted in the sealing tools 310, 320, 330, and 340. The construction of the heating unit is not particularly restricted as long as it is possible to heat the sealing tools to a temperature necessary to perform a sealing process.

A process of fixing the external shape fixation frame 200 to the outer surface of the electrode assembly 120 will be described with reference to FIGS. 2 to 6.

After the electrode assembly 120 is wrapped by the external shape fixation frame 200, the external shape fixation frame 200 brought into tight contact with the electrode assembly in a state of overlapping or facing the electrode assembly is pressed using the sealing apparatus 300 so as to be coupled by thermal fusion. Through the above process, a battery cell 1100 having the electrode assembly 120 fixed by the external shape fixation frame 200 is completed.

Although not shown in the drawings of the present invention, the separator and/or the separator sheet protrude so as to have longer lengths than the first electrode and the second electrode. The protruding portions of the separator and/or the separator sheet may be bent and fixed in the same direction by the external shape fixation frame 200. Consequently, it is possible to stably fix the unit cell and the separator and/or the separator sheet constituting the electrode assembly 120.

FIG. 7 is a schematic view of an external shape fixation frame according to a second embodiment of the present invention. The external shape fixation frame 1200 according to the second embodiment of the present invention is identical to the external shape fixation frame according to the first embodiment described with reference to FIGS. 2 to 6 except that the distance between adjacent first patterns 1210 and the distance between adjacent second patterns 1220 are formed to be large in a portion of the external shape fixation frame 1200. Hereinafter, therefore, only the construction of the first patterns 1210 and the second patterns 1220 will be described.

In the second embodiment, the distance between adjacent first patterns 1210 and the distance between adjacent second patterns 1220 of the external shape fixation frame 1200 formed at positions that face the fifth surface and the sixth surface of the electrode assembly may be formed so as to be greater than the distance between adjacent first patterns 1210 and the distance between adjacent second patterns 1220 of the external shape fixation frame 1200 formed at positions that face the first to fourth surfaces of the electrode assembly.

Each of the first pattern 1210 and the second pattern 1220 of the external shape fixation frame 1200 according to the second embodiment has a line shape, in the same manner as in the first embodiment. Here, the first pattern 1210 and/or the second pattern 1220 of the external shape fixation frame 1200 formed at positions that face the fifth surface and the sixth surface of the electrode assembly may be formed so as to be thicker than the first pattern 1210 and/or the second pattern 1220 of the external shape fixation frame 1200 located so as to face the first to fourth surfaces of the electrode assembly, or the first pattern 1210 or the second pattern 1220 located so as to face the first to fourth surfaces of the electrode assembly may be coupled in two layers, which is advantageous in stably supporting and fixing the fifth surface and the sixth surface of the electrode assembly.

The distance between the first patterns 1210 and the distance between the second patterns 1220 located so as to face the first to fourth surfaces are set so as to be equal to the distance between the first patterns and the distance between the second patterns in the first embodiment, whereby it is possible to stably fix the electrode and/or the separator located at the middle of the electrode assembly while wrapping the first to fourth surfaces of the electrode assembly that are easily deformed by movement and shaking of the unit cell and the separator constituting the electrode assembly using the relatively dense external shape fixation frame. In addition, it is possible to reduce the quantity of materials necessary to produce the external shape fixation frame 1200 while stably fixing the electrode assembly, which is advantageous in increasing economic benefits.

Also, in the second embodiment, the first pattern 1210 and the second pattern 1220 of the external shape fixation frame 1200 may not be formed at positions that face the fifth surface and the sixth surface of the electrode assembly. Consequently, it is possible to reduce the quantity of materials necessary to produce the external shape fixation frame 1200 while stably fixing the electrode assembly, which is advantageous in increasing economic benefits.

The electrode assembly according to the present invention described above may be applied to a lithium secondary battery and a secondary battery module.

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and technical idea of the present invention, and it will be obvious that such changes and modifications fall within the scope of the appended claims.

DESCRIPTION OF REFERENCE NUMERALS

10: Conventional electrode assembly
11: Positive electrode
12: Separator
13: Negative electrode
14: Adhesive tape
100, 1100: Battery cells
120: Electrode assembly
200, 1200: External shape fixation frames
210, 1210: First patterns
220, 1220: Second patterns
300: Sealing apparatus
310: Upper sealing tool
320: First side sealing tool
330: Second side sealing tool
340: Lower sealing tool

The invention claimed is:

1. An electrode assembly comprising:
a unit cell including:
  one or more electrodes; and
  one or more separators,
wherein the electrode assembly is (1) a stacked type electrode assembly, (2) a stacked and folded type electrode assembly, or (3) a wound type electrode assembly, and
the electrode assembly includes an external shape fixation frame configured to wrap a portion of an outer surface of the electrode assembly,
wherein the external shape fixation frame includes a lattice pattern in direct contact with the electrode assembly.

2. The electrode assembly according to claim 1, wherein the unit cell is a full cell, and
the electrode assembly comprises two or more full cells.

3. The electrode assembly according to claim 1, wherein the unit cell is a bi-cell, and
the electrode assembly comprises one or more bi-cells.

4. The electrode assembly according to claim 1, wherein the unit cell is a mono type half cell, and
the electrode assembly comprises three or more half cells.

5. The electrode assembly according to claim 1, wherein a first electrode terminal of a first electrode extends in a first direction and a second electrode terminal of a second electrode extends in the first direction.

6. The electrode assembly according to claim 5, wherein the electrode assembly defines a rectangular parallelepiped shape, and the rectangular parallelepiped electrode assembly comprises:

a first surface at which the first and second electrode terminals are located;

a second surface opposite the first surface;

a third surface and a fourth surface, opposite ends of which abut the first surface and the second surface, the third surface and the fourth surface having areas smaller than areas of the first and second surfaces; and a fifth surface and a sixth surface, opposite ends of which abut the first surface and the second surface, the fifth surface and the sixth surface having areas larger than areas of the first and second surfaces, and the external shape fixation frame is provided at regions corresponding to one or more of the first surface to the sixth surface.

7. The electrode assembly according to claim 6, wherein the external shape fixation frame is located at regions corresponding to the first surface and the second surface of the electrode assembly.

8. The electrode assembly according to claim 6, wherein the external shape fixation frame is located at regions corresponding to the first surface to the fourth surface of the electrode assembly.

9. The electrode assembly according to claim 1, wherein a size of the external shape fixation frame is 80% to 100% of a size of the outer surface of the electrode assembly at a region at which the external shape fixation frame is located.

10. The electrode assembly according to claim 1, wherein the external shape fixation frame is made of a thermoplastic resin.

11. A lithium secondary battery comprising:

the electrode assembly according to claim 1;

a battery case configured to receive the electrode assembly, and an electrolytic solution.

12. A battery module comprising the lithium secondary battery according to claim 11.

13. An electrode assembly configured to be received in a battery case, the electrode assembly comprising:

a unit cell including:

one or more electrodes, and one or more separators;

an external shape fixation frame configured to wrap around a portion of an outer surface of the electrode assembly, the external shape fixation frame including a lattice pattern wrapped around the electrode assembly, wherein the electrode assembly is (1) a stacked type electrode assembly, (2) a stacked and folded type electrode assembly, or (3) a wound type electrode assembly.

\* \* \* \* \*